H. P. BARNHART.
WEED DESTROYER.
APPLICATION FILED NOV. 17, 1914.
1,135,346.
Patented Apr. 13, 1915.
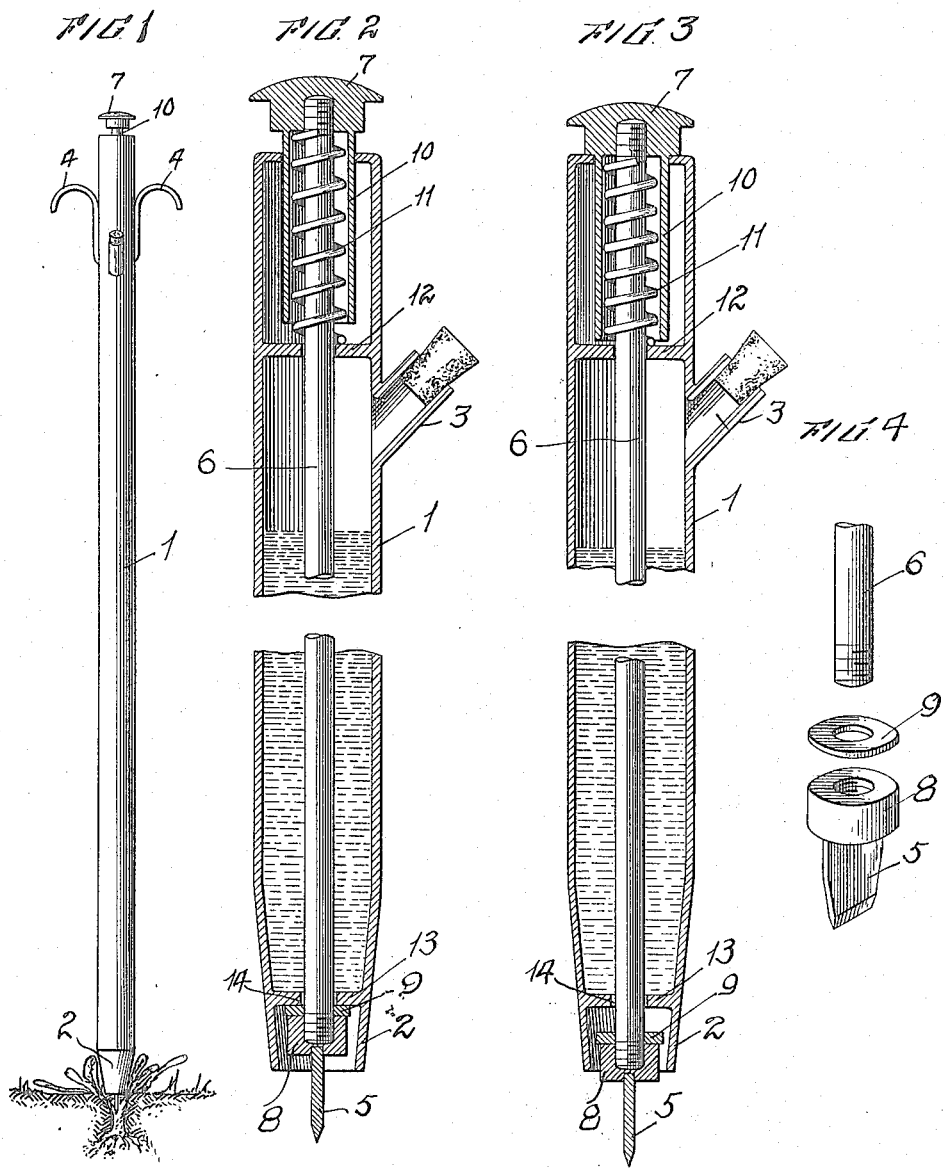
Inventor
Harvey P. Barnhart,
Witnesses
By Knight Bros
Attorneys

UNITED STATES PATENT OFFICE.

HARVEY P. BARNHART, OF PORTLAND, OREGON.

WEED-DESTROYER.

1,135,346.   Specification of Letters Patent.   Patented Apr. 13, 1915.

Application filed November 17, 1914. Serial No. 872,599.

*To all whom it may concern:*

Be it known that I, HARVEY P. BARNHART, a citizen of the United States, and resident of Portland, in the county of Multnomah and State of Oregon, have invented certain new and useful Improvements in Weed-Destroyers, of which the following is a specification.

My invention relates to means for destroying noxious plant life, and it is particularly adapted for use in destroying noxious plant life frequently found in lawns.

Heretofore appliances for digging and removing weeds have been employed, but such appliances have been found objectionable because of the labor involved in using them and the disfigurement of the lawn incident thereto.

It is the object of my invention to provide a device for wounding the plant and depositing a destroying substance in the wound thus produced.

Another object of my invention is to construct the device in such a manner that the operator may use the device while standing erect.

Still another object of my invention is to so construct the device that the destroying substance may be deposited in a small space thereby preventing other plants from being damaged.

With these and other objects in view, my invention may be more readily understood upon reference to the accompanying drawing which forms a part of this specification.

In said drawing—Figure 1 is a side elevation of the device; Fig. 2 is a vertical section of the device showing the incising instrument in its normal position; Fig. 3 is a similar view showing the incising instrument in position to allow discharge of the destroying substance, and Fig. 4 is a fragmentary view of the incising instrument and parts carried thereby.

Referring to the drawing in detail in which like parts are represented by like numerals, 1 represents a fluid receptacle having a tapered portion 2 and a fluid intake 3. Positioned on the side of the receptacle 1, are handles 4. This receptacle may be constructed of any design but is preferably cylindrical as shown. Mounted within the receptacle is an incising instrument 5 comprising a stem portion 6 having screw-threaded connection at its top with a knob 7, and at its lower end with a knife mounting 8 carried by the stem 6. Above the knife mounting 8 is a valve 9. The knob 7 is provided with a downwardly projecting extension 10 providing a housing for a spring 11 which provides means for returning the incising instrument to its normal position after it has been actuated by the operator.

12 and 13 represent a pair of walls which provide means for positioning the incising instrument in the receptacle. These walls also serve other functions, the upper one, represented by the numeral 12 providing means for supporting the spring 11, and the lower one 13 providing a discharge duct 14 for the delivery of the destroying substance.

The operation of the device is as follows: The operator places the knife against the center of the plant and presses the knob 7. This splits the stalk of the plant and the upper part of the root. The receptacle 1 is then raised by means of the handles 4, whereby the destroying substance is delivered through the duct 14 to the wound caused by the knife. It will be seen that the tapered end 2 of the device will prevent the destroying substance from scattering and damaging other plants.

I claim:—

1. A weed destroying device embodying a fluid receptacle, an incising instrument for cutting the weed associated with and adapted to have vertical movement therein, a pair of guide walls provided in said fluid receptacle, a spring for compelling the return movement of the incising instrument after it has been pressed downward and released, and a housing for said spring, one of said guide walls performing the combined purpose of positioning the incising instrument and supporting the said spring, and the other of said guide walls performing the combined purpose of positioning the incising instrument and providing a discharge duct for the delivery of the fluid to the weed to be destroyed, and means carried by the incising instrument for controlling the delivery of the fluid through said duct.

2. A weed destroyer embodying the fluid receptacle, an incising instrument for cutting the weed, associated with and adapted to have vertical movement therein, a discharge duct in said receptacle for delivering the fluid to the weed to be destroyed, means carried by said incising instrument for controlling the flow of fluid through said discharge duct, a knob provided on the incising instrument, a spring for compelling the return movement of the incising instrument after it has been actuated by pressing on said knob, and a handle on the fluid receptacle for raising the discharge duct out of engagement with the controlling means carried by the incising instrument, to allow delivery of the fluid to the weed.

The foregoing specification signed at Portland, Oregon.

HARVEY P. BARNHART.

In presence of—
 ROSCOE C. NELSON,
 LAURA N. TAPSCOTT.